(12) United States Patent
Girt et al.

(10) Patent No.: US 8,771,848 B2
(45) Date of Patent: Jul. 8, 2014

(54) BIT PATTERNED MAGNETIC MEDIA

(75) Inventors: Erol Girt, Fremont, CA (US); Hans J. Richter, Palo Alto, CA (US); Alexander Y. Dobin, Milpitas, CA (US)

(73) Assignee: Seagate Technology LLC, Cupertino, CA (US)

( * ) Notice: Subject to any disclaimer, the term of this patent is extended or adjusted under 35 U.S.C. 154(b) by 1185 days.

(21) Appl. No.: 11/544,634

(22) Filed: Oct. 10, 2006

(65) Prior Publication Data

US 2008/0085425 A1   Apr. 10, 2008

(51) Int. Cl.
    *G11B 5/66*    (2006.01)
    *B32B 3/00*    (2006.01)

(52) U.S. Cl.
     USPC ........ 428/820.2; 428/826; 428/827; 428/829; 428/195.1; 428/173

(58) Field of Classification Search
     USPC .................................................. 428/826, 829
     See application file for complete search history.

(56) References Cited

U.S. PATENT DOCUMENTS

| 5,956,216 | A | 9/1999 | Chou |
| 6,576,113 | B1 | 6/2003 | Scherer et al. |
| 6,579,634 | B2 * | 6/2003 | Saito .......................... 428/845.5 |
| 6,643,082 | B1 | 11/2003 | Belser |
| 6,738,207 | B1 | 5/2004 | Belser et al. |
| 6,890,667 | B1 * | 5/2005 | Lairson et al. ................. 428/611 |
| 6,947,235 | B2 * | 9/2005 | Albrecht et al. ................. 360/55 |
| 7,876,529 | B1 * | 1/2011 | Benakli et al. ................. 360/135 |
| 8,202,635 | B2 * | 6/2012 | Ruigrok ......................... 428/800 |
| 2002/0034666 | A1 | 3/2002 | Kiely |
| 2002/0142192 | A1 | 10/2002 | Kamata et al. |
| 2003/0234470 | A1 | 12/2003 | Haan et al. |
| 2004/0131890 | A1 | 7/2004 | Kikitsu et al. |
| 2004/0191557 | A1 | 9/2004 | Kamata et al. |
| 2004/0258833 | A1 | 12/2004 | Kamata et al. |
| 2005/0157597 | A1 | 7/2005 | Sendur et al. |
| 2006/0139799 | A1 * | 6/2006 | Wu et al. ..................... 360/97.03 |
| 2007/0070547 | A1 * | 3/2007 | Kamata et al. ................. 360/135 |

OTHER PUBLICATIONS http://www.merriam-webster.com/dictionary/or?show=1 &t=1287785773 (2010).*

* cited by examiner

*Primary Examiner* — Alicia Chevalier
*Assistant Examiner* — Frank D Ducheneaux
(74) *Attorney, Agent, or Firm* — Hollingsworth Davis, LLC

(57) ABSTRACT

A bit patterned magnetic recording medium, comprises a non-magnetic substrate having a surface; a plurality of spaced apart magnetic elements on the surface, each of the elements constituting a discrete magnetic domain or bit; and a layer of a ferromagnetic material for regulating magnetic exchange coupling between said magnetic elements. The layer has a saturation magnetization $M_s$ ranging from about 1 to about 2,000 emu/cm$^3$, preferably below about 400 emu/cm$^3$, more preferably below about 200 emu/cm$^3$, and may overlie, underlie, or at least partially fill spaces between adjacent magnetic elements.

37 Claims, 2 Drawing Sheets

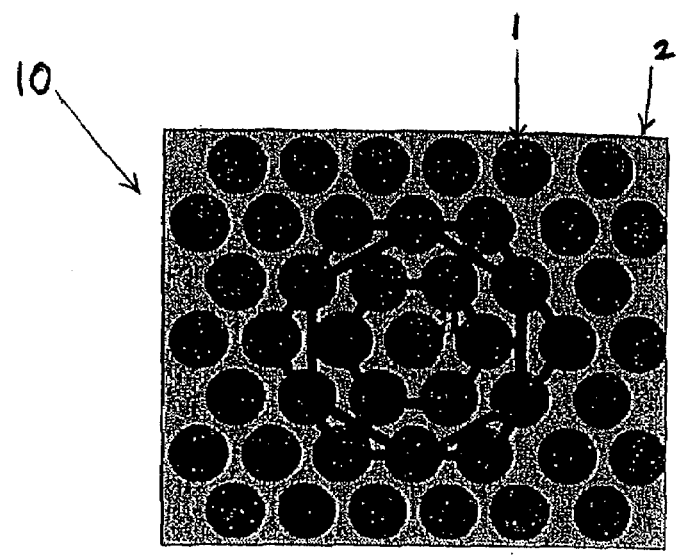
FIG. 1
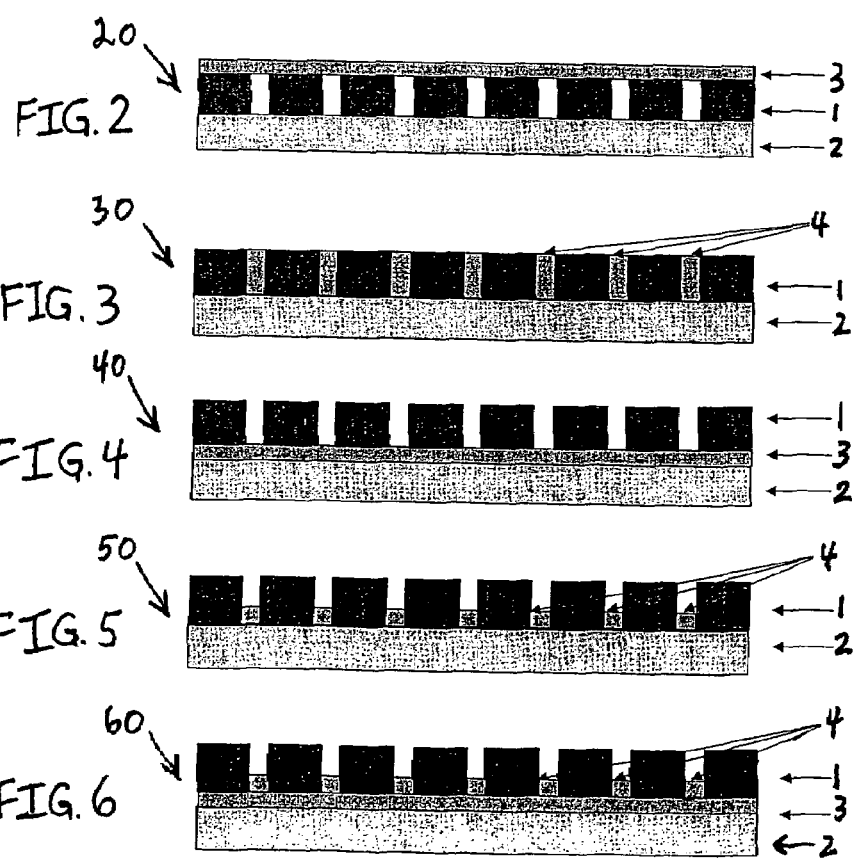
FIG. 2
FIG. 3
FIG. 4
FIG. 5
FIG. 6

BIT PATTERNED MAGNETIC MEDIA

FIELD OF THE INVENTION

The present invention relates to improved bit patterned magnetic recording media with direct exchange coupling between neighboring bits, and to methods of fabricating same. The invention has particular utility in the manufacture and use of high areal recording density magnetic media, e.g., in hard disk form, suitable for use in computer-related applications.

BACKGROUND OF THE INVENTION

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information.

Such conventional magnetic disk storage media incur several drawbacks and disadvantages which adversely affect realization of high areal density data/information storage, as follows:

(1) there is an infinite number of possibilities for the magnetic moments of the continuous magnetic film, and as a consequence, the write head must be able to write very precisely in order to precisely define, without error, the magnetic moment, location, and area of each bit on the magnetic film;

(2) since the continuous film tends to link exchange and magnetostatic interaction between neighboring magnetic bits, when the bits are very close, writing of one bit can result in writing of neighboring bits because of the exchange and magnetostatic interaction, causing errors in reading;

(3) the absence of physical boundaries between many bits of the continuous magnetic film cause the writing and reading process to occur in a "blind" fashion, i.e., the location of each bit is determined by calculating the movements of the disk and the read or write heads instead of physically sensing the actual bit location;

(4) the boundaries between adjacent pairs of bits tend to be ragged in continuous magnetic films, resulting in noise generation during reading; and (5) the requirement for increased areal recording density has necessitated a corresponding decrease in recording bit size or area. Consequently, recording bit sizes of continuous film media have become extremely minute, e.g., on the order of nanometers (nm). In order to obtain a sufficient output signal from such minute bits, the saturation magnetization ($M_s$) and thickness of the film must be as large as possible. However, the magnetization quantity of such minute bits is extremely small, resulting in a loss of stored information due to magnetization reversal by "thermal fluctuation", also known as the "superparamagnetic effect".

Regarding item (5) above, it is further noted that for longitudinal type continuous magnetic media, wherein the magnetic easy axis is oriented parallel to the film plane (i.e., surface), magnetization reversal by the superparamagnetic effect may occur even with relatively large magnetic particles or grains, thereby limiting increase in areal recording density to levels necessitated by current and future computer-related applications. On the other hand, for perpendicular type continuous magnetic media, wherein the magnetic easy axis is oriented perpendicular to the film plane (i.e., surface), growth of the magnetic particles or grains in the film thickness direction increases the volume of magnetization of the particles or grains while maintaining a small cross-sectional area (as measured in the film plane). As a consequence, onset of the superparamagnetic effect can be suppressed for very small particles or grains of minute width. However, further decrease in grain width in perpendicular media necessitated by increasing requirements for areal recording density will inevitably result in onset of the superparamagnetic effect even for such type media.

The superparamagnetic effect is a major limiting factor in increasing the areal recording density of continuous film magnetic recording media. Superparamagnetism results from thermal excitations which perturb the magnetization of grains in a ferromagnetic material, resulting in unstable magnetization. As the grain size of magnetic media is reduced to achieve higher areal recording density, the superparamagnetic instabilities become more problematic. The superparamagnetic effect is most evident when the grain volume V is sufficiently small such that the inequality $K_\mu V/k_B T > 40$ cannot be maintained, where $K_\mu$ is the magnetic crystalline anisotropy energy density of the material, $k_B$ is Boltzmann's constant, and T is the absolute temperature. When this inequality is not satisfied, thermal energy demagnetizes the individual magnetic grains and the stored data bits are no longer stable. Consequently, as the magnetic grain size is decreased in order to increase the areal recording density, a threshold is reached for a given $K_\mu$ and temperature T such that stable data storage is no longer possible.

So-called "patterned" or "bit patterned" magnetic media have been proposed as a means for overcoming the above-described problem of conventional continuous magnetic media associated with magnetization reversal via the superparamagnetic effect, e.g., as disclosed in U.S. Pat. No. 5,956,216, the entire disclosure of which is incorporated herein by reference. The term "patterned" media generally refers to magnetic data/information storage and retrieval media wherein a plurality of discrete, independent regions of magnetic material form discrete, independent magnetic elements which function as recording bits are formed on a non-magnetic substrate. Since the regions of ferromagnetic material comprising the magnetic bits or elements are independent of each other, mutual interference between neighboring bits can be minimized. As a consequence, patterned magnetic media are advantageous vis-à-vis continuous magnetic media in reducing recording losses and noises arising from neighboring magnetic bits. In addition, patterning of the magnetic layer advantageously increases resistance to domain wall movement, i.e., enhances domain wall pinning, resulting in improved magnetic performance characteristics.

Generally, each magnetic bit or element has the same size and shape, and is composed of the same magnetic material as the other elements. The elements are arranged in a regular pattern over the substrate surface, with each element having a small size and desired magnetic anisotropy, so that, in the absence of an externally applied magnetic field, the magnetic moments of each discrete magnetic element will aligned along the same magnetic easy axis. Stated differently, the magnetic moment of each discrete magnetic element has only two states: the same in magnitude but aligned in opposite directions. Each discrete magnetic element forms a single magnetic domain or bit and the size, area, and location of each domain is determined during the fabrication process.

During writing operation of such patterned media, the direction of the magnetic moment of the single magnetic domain element or bit is flipped along the easy axis, and during reading operation, the direction of the single magnetic domain element or bit is sensed. The direction of the magnetic easy axis of each single magnetic domain, element, or bit can be parallel or perpendicular to the surface of the domain, element, or bit, corresponding to conventional continuous longitudinal and perpendicular media, respectively. Stated differently, the nature (i.e., type) of the magnetic recording layer of the magnetic domain elements or bits is not critical in patterned media, and may, for example, be selected from among longitudinal, perpendicular, laminated, anti-ferromagnetically coupled (AFC), granular, superlattice, etc., types.

Patterned media in disk form offer a number of advantages relative to conventional disk media. Specifically, the writing process is greatly simplified, resulting in much lower noise and lower error rate, thereby allowing much higher areal recording density. In patterned disk media, the writing process does not define the location, shape, and magnetization value of a bit, but merely flips the magnetization orientation of a patterned single domain magnetic structure. Writing of data can be essentially perfect, even when the transducer head deviates slightly from the intended bit location and partially overlaps neighboring bits, as long as only the magnetization direction of the intended bit is flipped. By contrast, in conventional magnetic disk media, the writing process must define the location, shape, and magnetization of a bit. Therefore, with such conventional disk media, if the transducer head deviates from the intended location, the head will write to part of the intended bit and to part of the neighboring bits. Another advantage of patterned media is that crosstalk between neighboring bits is reduced relative to conventional media, whereby areal recording density is increased. Each individual magnetic element, domain, or bit of a patterned medium can be tracked individually, and reading is less jittery than in conventional disks.

In bit patterned media, interaction between the discrete magnetic elements is purely magnetostatic, and is inversely proportional to the cube of the distance, r, between neighboring magnetic elements (bits), i.e., $1/r^3$. FIG. 1 illustrates the situation when the discrete elements are in the form of circularly shaped columns arranged in a hexagonal close-packed array, i.e., where each magnetic element is surrounded by 6 first nearest neighbor magnetic elements, where r=a; 6 second nearest neighbor magnetic elements, where r=a√3; and so on. On average, the number of magnetic elements or bits that surround a magnetic element or bit increases with the square of the distance r, i.e., as $r^2$. As a consequence, the total magnetostatic interaction between a magnetic element and its neighboring magnetic elements decreases with distance r as 1/r (noting that the magnetostatic interaction between two magnetic elements decreases with distance r as $1/r^3$ and the number of magnetic elements increases with distance r as $r^2$). It follows, therefore, that the coercivity field, $H_c$, of each magnetic element depends upon the magnetic state of the neighboring magnetic elements due to the magnetostatic interaction. A drawback of conventionally structured bit patterned magnetic media arising from the dependence of the coercivity field $H_c$ of each magnetic element on the magnetic state of the neighboring magnetic elements due to the magnetostatic interaction is disadvantageous creation of a distribution of $H_c$, resulting in a deterioration of the magnetic performance characteristics of such bit patterned media. In addition, the magnetostatic interaction disadvantageously lowers the thermal stability of the magnetic elements.

In view of the foregoing disadvantages and drawbacks resulting from magnetostatic interaction between neighboring magnetic elements of conventionally structured bit patterned media, leading to a distribution of $H_c$ with attendant deterioration of magnetic properties and reduction in thermal stability, there exists a clear need for improved bit patterned media (and methodology therefor) which function in optimal fashion such that the above-described disadvantages and drawbacks are effectively eliminated or at least minimized.

DISCLOSURE OF THE INVENTION

An advantage of the present invention is an improved bit patterned magnetic recording medium with reduced coercivity distribution, improved stability, regulated exchange coupling between discrete magnetic elements, reduced demagnetization fields, and improved bit error rate (BER).

Another advantage of the present invention is an improved method of fabricating a bit patterned magnetic recording medium with reduced coercivity distribution, improved stability, regulated exchange coupling between discrete magnetic elements, reduced demagnetization fields, and improved bit error rate (BER).

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved bit patterned magnetic recording medium, comprising:

(a) a non-magnetic substrate having a surface;

(b) a plurality of spaced apart magnetic elements on the surface, each of the elements constituting a discrete magnetic domain or bit; and (c) at least one of a layer of a ferromagnetic material and a matrix of a ferromagnetic material for regulating magnetic exchange coupling between the magnetic elements.

In accordance with embodiments of the present invention, the ferromagnetic material has a saturation magnetization $M_s$ ranging from about 1 to about 2,000 emu/cm$^3$, preferably below about 400 emu/cm$^3$, more preferably below about 200 emu/cm$^3$.

Embodiments of the present invention include those wherein the ferromagnetic material comprises a combination or alloy of at least one ferromagnetic element and at least one additional element. Preferably, the ferromagnetic material comprises at least one ferromagnetic element selected from the group consisting of Fe, Co, and Ni and at least one additional element selected from the group consisting of Al, Si, Ti, V, Cr, Zr, Nb, Mo, Ru, Rh, Pd, Ag, Hf, Ta, W, Re, Ir, Pt, and Au.

According to embodiments of the present invention, the layer or matrix of the ferromagnetic material is located above, below, or between each of the plurality of magnetic elements; whereas, according to other embodiments of the invention, a layer of a ferromagnetic material is located below each of the plurality of magnetic elements and a matrix of a ferromagnetic material is located between each of the plurality of magnetic elements. Preferably, each of the magnetic elements has the same structure, comprised of a stack of thin film layers including at least one magnetic recording layer; the structure of the magnetic elements is selected from the group consisting of longitudinal, perpendicular, laminated, anti-ferromagnetically coupled (AFC), granular, and superlattice structures; and the layer or matrix of ferromagnetic material overlies each of the layer stacks, underlies each of the layer stacks, or at least partially fills spaces between adjacent layer stacks.

According to further embodiments of the present invention, a layer of a ferromagnetic material is located below each of the layer stacks and a matrix of a ferromagnetic material is located between each of the layer stacks; a non-magnetic interlayer is present between the substrate and the at least one magnetic recording layer for controlling the crystallographic structure/orientation of the at least one magnetic recording layer; and a soft magnetic underlayer (SUL) is present between the substrate and the non-magnetic interlayer.

Another aspect of the present invention is an improved method of fabricating a bit patterned magnetic recording medium, comprising steps of:

(a) providing a non-magnetic substrate having a surface;

(b) forming a plurality of spaced apart magnetic elements on the surface, each of the elements constituting a discrete magnetic domain or bit; and (c) providing at least one of a layer of a ferromagnetic material and a matrix of a ferromagnetic material between the magnetic elements for regulating magnetic exchange coupling between the magnetic elements.

According to embodiments of the present invention, step (c) comprises providing a layer of the ferromagnetic material having a saturation magnetization $M_s$ ranging from about 1 to about 2,000 emu/cm$^3$ and selected for reducing coercivity distribution of the magnetic elements, partially shunting magnetostatic interaction therebetween, and reducing demagnetization fields and bit error rate (BER).

In accordance with embodiments of the present invention, step (c) comprises providing a ferromagnetic material having a saturation magnetization $M_s$ below about 400 emu/cm$^3$, preferably below about 200 emu/cm$^3$, more preferably below about 200 emu/cm$^3$.

Embodiments of the present invention include those wherein step (c) comprises providing a layer of a ferromagnetic material comprising a combination or alloy of at least one ferromagnetic element and at least one additional element, preferably a ferromagnetic material comprising at least one ferromagnetic element selected from the group consisting of Fe, Co, and Ni and at least one additional element selected from the group consisting of Al, Si, Ti, V, Cr, Zr, Nb, Mo, Ru, Rh, Pd, Ag, Hf, Ta, W, Re, Ir, Pt, and Au.

According to embodiments of the present invention, step (c) comprises providing the layer or matrix of ferromagnetic material above, below, or between each of the plurality of magnetic elements; step (b) comprises forming each of the magnetic elements with the same structure comprised of a stack of thin film layers including at least one magnetic recording layer, the structure being selected from the group consisting of longitudinal, perpendicular, laminated, anti-ferromagnetically coupled (AFC), granular, and superlattice structures; and step (c) comprises forming the layer of ferromagnetic material or the matrix of ferromagnetic material to overlie each of the layer stacks, underlie each of the layer stacks, or at least partially fill spaces between adjacent layer stacks.

According to further embodiments of the present invention, step (c) comprises providing a layer of a ferromagnetic material below each of the layer stacks and a matrix of a ferromagnetic material between each of the layer stacks; step (b) comprises forming each of the layer stacks as comprising a non-magnetic interlayer between the substrate and the at least one magnetic recording layer for controlling the crystallographic structure/orientation of the at least one magnetic recording layer; and step (b) further comprises forming each of the layer stacks as comprising a soft magnetic underlayer (SUL) between the substrate and the non-magnetic interlayer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features and the same reference numerals are employed throughout for designating similar features, wherein:

FIG. 1 is a schematic plan view for illustrating a portion of a bit patterned magnetic recording medium comprising a plurality of discrete magnetic elements in the form of circularly shaped columns arranged in a hexagonal close-packed array on a suitable substrate; and FIGS. 2-11 schematically illustrate, in simplified cross-sectional view, portions of embodiments of bit patterned magnetic recording media according to the present invention and comprising a layer of a ferromagnetic material or a matrix of a ferromagnetic material between the magnetic elements for regulating magnetic exchange coupling between the magnetic elements.

DESCRIPTION OF THE INVENTION

Figure 7:
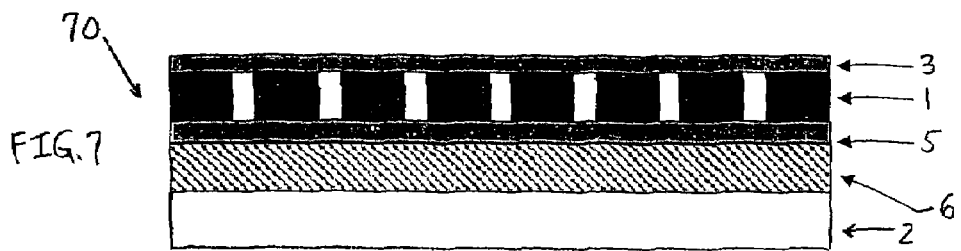

The present invention addresses and solves the above-described drawbacks and disadvantages associated with conventionally structured bit patterned magnetic recording media, wherein the coercivity field $H_c$ of each magnetic element depends upon the magnetic state of the neighboring magnetic elements due to magnetostatic mutual interaction(s), including disadvantageous creation of a coercivity field distribution which causes deterioration of the magnetic performance characteristics, lowered thermal stability, and increased bit error rate (BER), while maintaining full compatibility with all aspects of conventional manufacturing technology and methodology for bit patterned media.

Briefly stated, the present inventors have determined that improved bit patterned magnetic recording media are obtainable by providing such media with a layer of a ferromagnetic material for regulating magnetic exchange coupling between the magnetic elements. The layer comprises a ferromagnetic material having a saturation magnetization $M_s$ ranging from about 1 to about 2,000 emu/cm$^3$ and is selected for reducing coercivity field distribution of the magnetic elements, partially shunting magnetostatic interaction therebetween, and reducing demagnetization fields and bit error rate (BER). Preferably, the ferromagnetic material has a saturation magnetization $M_s$ below about 400 emu/cm$^3$, more preferably below about 200 emu/cm$^3$. The inventors have further determined that the inventive methodology is versatile, i.e., the layer of ferromagnetic material may be provided above, below, or between each of the plurality of discrete magnetic elements of such media, and each of the magnetic elements may comprise a conventional structure selected from the group consisting of longitudinal, perpendicular, laminated, anti-ferromagnetically coupled (AFC), granular, and superlattice media designs.

It has been further determined that the inventive methodology affords a significant improvement, i.e., reduction, in the demagnetization field of bit patterned magnetic media, e.g., on the order of about 25% relative to conventionally structured bit patterned media without the coupling layer. In addition, $BER_w$ is increased by about 1 dB for a 1 Tbit design.

Referring to FIGS. 2-6, respectively schematically illustrated therein, in simplified cross-sectional view, are portions of embodiments of bit patterned magnetic recording media 20, 30, 40, 50, and 60 according to illustrative, but non-limitative, embodiments of the present invention, each comprising a non-magnetic substrate 2 having a surface over which a plurality of spaced apart, discrete magnetic recording elements 1 are formed, and a coupling layer 3 or matrix 4 of a ferromagnetic material of selected saturation magnetization $M_s$ for regulating magnetic exchange coupling between the discrete magnetic recording elements 1.

As illustrated in FIGS. 2-6 and indicative of the versatility of the present invention, a layer 3 of ferromagnetic material of selected saturation magnetization $M_s$ may overlie the discrete magnetic recording elements 1, as in medium 20 shown in FIG. 2; a matrix 4 of ferromagnetic material of selected saturation magnetization $M_s$ may completely fill the spaces between adjacent discrete magnetic recording elements 1, as in medium 30 shown in FIG. 3; a layer 3 of ferromagnetic material of selected saturation magnetization $M_s$ may underlie the discrete magnetic recording elements 1, as in medium 40 shown in FIG. 4; a matrix 4 of ferromagnetic material of selected saturation magnetization $M_s$ may partially fill the spaces between adjacent discrete magnetic recording elements 1, as in medium 50 shown in FIG. 5; and a layer 3 of ferromagnetic material of selected saturation magnetization $M_s$ may underlie the discrete magnetic recording elements 1, along with a matrix 4 of ferromagnetic material of selected saturation magnetization $M_s$ partially filling the spaces between adjacent discrete magnetic recording elements 1, as in medium 60 shown in FIG. 6.

As described in more detail below, in medium 60 shown in FIG. 6, layer 3 of ferromagnetic material underlying the discrete magnetic recording elements 1 may serve as an interlayer for promoting a desired crystallographic growth orientation of the magnetic recording layer(s) of the magnetic recording elements and, if necessary, to magnetically decouple any soft magnetic underlayer (SUL) included as part of substrate 2.

According to the invention, layer 3 of a ferromagnetic material has a selected saturation magnetization $M_s$ ranging from about 1 to about 2,000 emu/cm$^3$ for reducing the coercivity distribution of the magnetic elements 1, partially shunting magnetostatic interaction therebetween, and reducing demagnetization fields and bit error rate (BER). Preferably, the ferromagnetic material has a saturation magnetization $M_s$ below about 400 emu/cm$^3$, more preferably below about 200 emu/cm$^3$. The thickness of layer 3 is depends on the saturation magnetization $M_s$ of the material of the layer. If $M_s$ is large, layer 3 is thinner than when $M_s$ is small. For example, if $M_s$ of layer 3 is greater than about 1,000 emu/cm$^3$, the thickness thereof will generally be less than about 5 nm, but when $M_s$ of layer 3 is about 200 emu/cm$^3$, the thickness is generally less than about 25 nm. The ferromagnetic material of layer 3 comprises an alloy or combination of at least one ferromagnetic element and at least one additional element, preferably comprising at least one ferromagnetic element selected from the group consisting of Fe, Co, and Ni and at least one additional element selected from the group consisting of Al, Si, Ti, V, Cr, Zr, Nb, Mo, Ru, Rh, Pd, Ag, Hf, Ta, W, Re, Ir, Pt, and Au.

The non-magnetic substrate 2 may be comprised of a non-magnetic material selected from the group consisting of: Al, Al—Mg alloys, other Al-based alloys, NiP-plated Al or Al-based alloys, glass, ceramics, glass-ceramics, polymeric materials, and composites or laminates of these materials. The thickness of substrate 2 is not critical; however, in the case of magnetic recording media for use in hard disk applications, substrate 2 must be of a thickness sufficient to provide the necessary rigidity.

As indicated above, the nature of the magnetic elements 1 is not critical for practice of the present invention and obtainment of the several advantages afforded thereby. Specifically, each of the magnetic elements 1 may comprise conventional magnetic recording media structures or designs in the form of thin film layer stacks, selected from the group consisting of longitudinal, perpendicular, laminated, anti-ferromagnetically coupled (AFC), granular, and superlattice media. It should be noted, however, that ferromagnetic layer 3 according to the present invention is distinct from any ferromagnetic layer(s) forming part of the layer stacks of the magnetic elements 1 (e.g., a soft magnetic underlayer, SUL, of perpendicular media), and is not to be equated therewith for any purpose. Further, in the embodiments shown in FIGS. 2 and 3, protective overcoat and lubricant topcoat layers (not shown in the figures for illustrative simplicity) are formed over ferromagnetic layer 3 in media 20 and over magnetic elements 1 and the intervening upper portions of the segments of ferromagnetic layer 3 in media 30; whereas, in the embodiments shown in FIGS. 4, 5, and 6, the protective overcoat and lubricant topcoat layers (again not shown in the figures for illustrative simplicity) are formed over ferromagnetic layer 3 in media 40, 50, and 60.

According to the invention, each layer of the layer stacks comprising the magnetic elements 1, as well as ferromagnetic layer 3 of selected saturation magnetization $M_s$ for regulating magnetic exchange coupling between the discrete magnetic recording elements 1 and the protective overcoat layer may be deposited or otherwise formed by any suitable technique utilized for formation of thin film layers, e.g., any suitable physical vapor deposition ("PVD") technique, including, but not limited to, sputtering, vacuum evaporation, ion plating, cathodic arc deposition ("CAD"), etc., or by any combination of various PVD techniques. The lubricant topcoat layer may be provided over the upper surface of the protective overcoat layer in any convenient manner, e.g., as by dipping the thus-formed medium into a liquid bath containing a solution of the lubricant compound.

Further according to the invention, the discrete magnetic elements 1 may be formed in any conventional manner, e.g., as by initial deposition of a layer stack of desired structure or design for a selected media type which continuously extends over the surface of substrate 2, followed by patterning by according to conventional techniques, including, for example, physical and/or chemical deposition and materials removal methodologies including photolithographic masking, etching, etc., or by photolithographic masking followed by selective deposition of materials comprising the layer stack through apertures formed in the masking layer. In addition, it should be noted that the present invention is not limited to formation of circular, columnar-shaped discrete magnetic elements arrayed in a hexagonal close packed pattern as in FIG. 1; rather, the invention is broadly applicable to all manner of shapes and arrays of discrete magnetic elements.

According to certain embodiments of the present invention, each of the layer stacks comprises a non-magnetic interlayer between the substrate and the at least one magnetic recording layer for controlling the crystallographic structure/orientation of the at least one magnetic recording layer. More specifically, according to preferred embodiments of the invention, a non-magnetic interlayer is provided beneath the ferromagnetic layer for forming magnetic elements with recording layers having hcp crystal structure with <0002> orientation perpendicular to the film plane. In such instances, the non-magnetic interlayer comprises an amorphous layer and a layer with a fcc or hcp crystallographic structure. When the layer has a fcc structure, it grows with <111> orientation perpendicular to the film plane and when it has a hcp structure, it grows with <0002> orientation perpendicular to the film plane.

When the layer of ferromagnetic material is formed between a non-magnetic interlayer and magnetic recording layer of the magnetic elements, it should have fcc or hcp crystallographic structure/orientation. When the layer of ferromagnetic material has a fcc crystallographic structure, it should grow with <111> orientation perpendicular to the film plane and when the layer of ferromagnetic material has a hcp crystallographic structure, it should grow with <0002> orientation perpendicular to the film plane.

Figure 8:
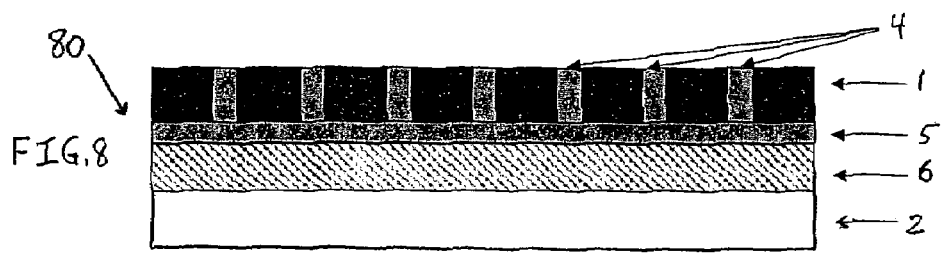
Figure 9:
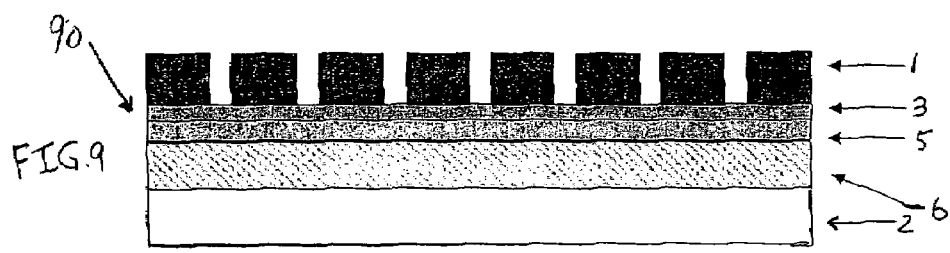
Figure 10:
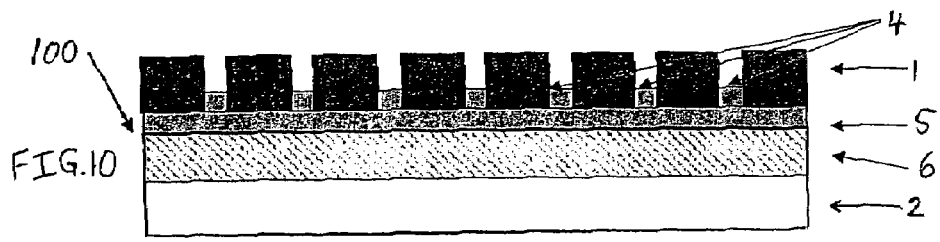
Figure 11:
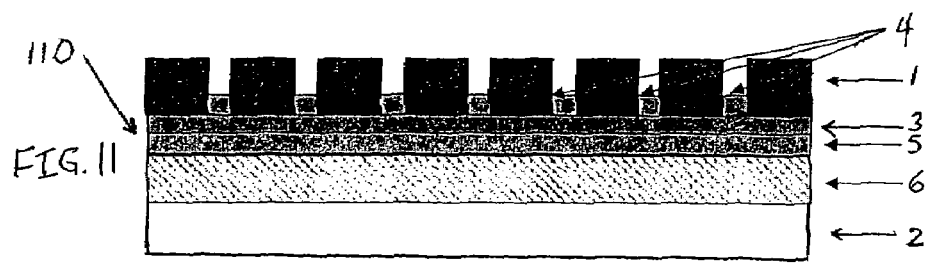

According to further embodiments of the invention, step (b) comprises forming each of the layer stacks as comprising a soft magnetic underlayer (SUL) between the substrate and the non-magnetic interlayer, in which case the material of the SUL is preferably amorphous. FIGS. 7-11 schematically illustrate embodiments of perpendicular bit patterned media 70, 80, 90, 100, and 110 according to the invention with structures similar to those of bit patterned media 20, 30, 40, 50, and 60 shown in FIGS. 2-6, respectively, but wherein bit patterned media 70, 80, 90, 100, and 110 each comprise a non-magnetic interlayer 5 and a soft magnetic underlayer (SUL) 6 between substrate 2 and magnetic elements 1.

Thus, the present invention advantageously provides improved performance, high areal density, bit patterned magnetic media which media afford substantially improved demagnetization fields and bit error rate $BER_w$ by virtue of the presence of the ferromagnetic coupling layer. The media of the present invention enjoy particular utility in high recording density systems for computer-related applications. In addition, the inventive media can be fabricated by means of conventional media manufacturing technologies, as indicated above.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An apparatus, comprising:
    (a) a plurality of spaced apart magnetic elements, each of said elements constituting a discrete magnetic domain or bit; and
    (b) a matrix of ferromagnetic material partially filling spaces between said magnetic elements, the matrix of ferromagnetic material comprising a property that facilitates regulation of magnetic exchange coupling between the magnetic elements.

2. The apparatus according to claim 1, wherein a layer of a second ferromagnetic material is below all of said plurality of magnetic elements.

3. An apparatus, comprising:
    a substrate having a surface;
    a plurality of spaced apart magnetic elements on the surface, each of the magnetic elements constituting a discrete magnetic domain or bit; and
    at least one of a matrix of a ferromagnetic material disposed between adjacent magnetic elements of the plurality of spaced apart magnetic elements and a layer of a ferromagnetic material disposed above the magnetic elements, the at least one of the matrix of the ferromagnetic material and the layer of the ferromagnetic material comprising a property that facilitates regulation of magnetic exchange coupling between the magnetic elements.

4. The apparatus according to claim 3, wherein the property of the ferromagnetic material comprises a saturation magnetization M, ranging from about 1 to about 2,000 emu/cm$^3$.

5. The apparatus according to claim 3, wherein the property of the ferromagnetic material comprises a saturation magnetization M below about 400 emu/cm$^3$.

6. The apparatus according to claim 3, wherein the property of the ferromagnetic material comprises a saturation magnetization M below about 200 emu/cm$^3$.

7. The apparatus according to claim 3, wherein the ferromagnetic material comprises a combination or alloy of at least one ferromagnetic element and at least one additional element.

8. The apparatus according to claim 3, wherein the ferromagnetic material comprises:
    a combination or alloy of at least one ferromagnetic element selected from the group consisting of Fe, Co, and Ni; and
    at least one additional element selected from the group consisting of Al, Si, Ti, V, Cr, Zr, Nb, Mo, Ru, Rh, Pd, Ag, Hf, Ta, W, Re, Ir, Pt, and Au.

9. The apparatus according to claim 3, wherein the layer of the ferromagnetic material is disposed above the magnetic elements.

10. The apparatus according to claim 3, wherein the matrix of the ferromagnetic material partially fills spaces between adjacent magnetic elements of the plurality of spaced apart magnetic elements.

11. The apparatus according to claim 3, wherein the matrix of the ferromagnetic material completely fills spaces between adjacent magnetic elements of the plurality of spaced apart magnetic elements.

12. The apparatus according to claim 3, wherein the matrix of the ferromagnetic material is disposed between the magnetic elements and a layer of the ferromagnetic material is disposed below the magnetic elements.

13. The apparatus according to claim 3, wherein each of the magnetic elements has the same structure and comprises a stack of thin film layers including at least one magnetic recording layer.

14. The apparatus according to claim 13, wherein the structure of each of the magnetic elements is selected from the group consisting of longitudinal, perpendicular, laminated, anti-ferromagnetically coupled (AFC), granular, and superlattice structures.

15. The apparatus according to claim 13, wherein the matrix of the ferromagnetic material at least partially fills spaces between adjacent stacks and a layer of the ferromagnetic material is disposed below the stacks.

16. The apparatus according to claim 13, wherein the matrix of the ferromagnetic material is disposed between the stacks and a layer of the ferromagnetic material is disposed below the stacks.

17. The apparatus according to claim 13, comprising a non-magnetic interlayer disposed between the substrate and the at least one magnetic recording layer that controls a crystallographic structure/orientation of the at least one magnetic recording layer.

18. The apparatus according to claim 17, comprising a soft magnetic underlayer (SUL) disposed between the substrate and the non-magnetic interlayer.

19. A method of fabricating a bit patterned magnetic recording medium, comprising:
forming a plurality of spaced apart magnetic elements on a surface of a substrate, each of the magnetic elements constituting a discrete magnetic domain or bit; and
forming at least one of a matrix of a ferromagnetic material between adjacent magnetic elements of the plurality of spaced apart magnetic elements and a layer of a ferromagnetic material above the magnetic elements, the at least one of the matrix of the ferromagnetic material and the layer of the ferromagnetic material comprising a property that facilitates regulation of magnetic exchange coupling between the magnetic elements.

20. The method according to claim 19, wherein the ferromagnetic material comprises a saturation magnetization M, ranging from about 1 to about 2,000 emu/cm$^3$ and is selected for one or more of reducing coercivity distribution of the magnetic elements, partially shunting magnetostatic interaction therebetween, and reducing demagnetization fields.

21. The method according to claim 19, wherein the ferromagnetic material comprises a saturation magnetization M below about 400 emu/cm$^3$.

22. The method according to claim 19, wherein the ferromagnetic material comprises a saturation magnetization M below about 200 emu/cm$^3$.

23. The method according to claim 19, wherein the ferromagnetic material comprises a combination or alloy of at least one ferromagnetic element and at least one additional element.

24. The method according to claim 19, wherein the ferromagnetic material comprises at least one ferromagnetic element selected from the group consisting of Fe, Co, and Ni and at least one additional element selected from the group consisting of Al, Si, Ti, V, Cr, Zr, Nb, Mo, Ru, Rh, Pd, Ag, Hf, Ta, W, Re, Ir, Pt, and Au.

25. The method according to claim 19, wherein the matrix of the ferromagnetic material is formed between the magnetic elements, and the layer of the ferromagnetic material is formed above the magnetic elements.

26. The method according to claim 19, wherein the matrix of the ferromagnetic material is formed between the magnetic elements, and a layer of the ferromagnetic material is formed below the magnetic elements.

27. The method according to claim 19, wherein forming the plurality of spaced apart magnetic elements comprises forming each of the magnetic elements with the same structure, the structure comprising a stack of thin film layers including at least one magnetic recording layer.

28. The method according to claim 27, wherein forming the plurality of spaced apart magnetic elements comprises forming each of the magnetic elements with a structure selected from the group consisting of longitudinal, perpendicular, laminated, anti-ferromagnetically coupled (AFC), granular, and superlattice structures.

29. The method according to claim 27, wherein providing the matrix of the ferromagnetic material at least partially fills spaces between adjacent stacks, and wherein the layer of the ferromagnetic material is formed above each of the stacks.

30. The method according to claim 27, wherein the matrix of the ferromagnetic material at least partially fills spaces between adjacent stacks, and a layer of the ferromagnetic material is formed below each of the stacks.

31. The method according to claim 27, wherein forming the plurality of spaced apart magnetic elements comprises forming each of the stacks to include a non-magnetic interlayer between the substrate and the at least one magnetic recording layer for controlling the crystallographic structure/orientation of the at least one magnetic recording layer.

32. The method according to claim 31, wherein forming the plurality of spaced apart magnetic elements comprises forming each of the stacks to include a soft magnetic underlayer (SUL) between the substrate and the non-magnetic interlayer.

33. A bit patterned magnetic recording medium, comprising:
a substrate having a surface;
a plurality of spaced apart magnetic elements on the surface, each of the magnetic elements constituting a discrete magnetic domain or bit; and
at least one of a matrix of a ferromagnetic material disposed between the magnetic elements and a layer of a ferromagnetic material disposed above the magnetic elements, the at least one of the matrix of the ferromagnetic material and the layer of the ferromagnetic material comprising a property that facilitates control of a coercivity field ($H_C$) distribution resulting from magnetostatic interaction between the magnetic elements.

34. The medium according to claim 33, wherein the at least one of the matrix of the ferromagnetic material and the layer of the ferromagnetic material comprises a property that facilitates control of magnetostatic interaction between neighboring ones of the magnetic elements.

35. The medium according to claim 33, wherein the at least one of the matrix of the ferromagnetic material and the layer of the ferromagnetic material comprises a property that facilitates control of demagnetization fields of the bit patterned magnetic recording medium.

36. The medium according to claim 33, wherein the at least one of the matrix of the ferromagnetic material and the layer of the ferromagnetic material comprises a property that facilitates control of thermal stability of the magnetic elements.

37. The medium according to claim 33, wherein the property of the ferromagnetic material comprises a saturation magnetization M, ranging from about 1 to about 2,000 emu/cm$^3$.

* * * * *